US011585364B2

United States Patent
Koontz et al.

(10) Patent No.: US 11,585,364 B2
(45) Date of Patent: Feb. 21, 2023

(54) BLIND FASTENER

(71) Applicant: MONOGRAM AEROSPACE FASTENERS, INC., Los Angeles, CA (US)

(72) Inventors: Elaine Koontz, Manhattan Beach, CA (US); Emory K. Tamashiro, San Pedro, CA (US); James Mitchell, Downey, CA (US)

(73) Assignee: MONOGRAM AEROSPACE FASTENERS, INC., Los Angeles, CA (US)

( * ) Notice: Subject to any disclaimer, the term of this patent is extended or adjusted under 35 U.S.C. 154(b) by 354 days.

(21) Appl. No.: 17/007,209

(22) Filed: Aug. 31, 2020

(65) Prior Publication Data

US 2020/0400179 A1 Dec. 24, 2020

Related U.S. Application Data

(63) Continuation of application No. 16/390,557, filed on Apr. 22, 2019, now Pat. No. 10,760,605, which is a
(Continued)

(51) Int. Cl.
*F16B 19/10* (2006.01)

(52) U.S. Cl.
CPC ...... *F16B 19/1063* (2013.01); *F16B 19/1054* (2013.01); *F16B 19/10* (2013.01)

(58) Field of Classification Search
CPC .. F16B 13/004; F16B 13/061; F16B 13/0858; F16B 13/124; F16B 19/10;
(Continued)

(56) References Cited

U.S. PATENT DOCUMENTS 2,787,185 A   2/1957 Rae et al.
3,129,630 A   4/1964 Wing et al.
(Continued)

FOREIGN PATENT DOCUMENTS

CN   1791493   6/2006
GB   1413592   12/1975

OTHER PUBLICATIONS

European Patent Office, Extended European Search Report, EP 20151496 dated May 20, 2020.
(Continued)

*Primary Examiner* — Roberta S Delisle
(74) *Attorney, Agent, or Firm* — McDonald Hopkins LLC

(57) ABSTRACT

Disclosed is a fastener that includes a nut with a threaded bore that includes a head on one end having three recesses, a cylindrical outer surface and a tapered ramp on the other end, a bolt that includes a head, a threaded portion engaged with the threaded bore, a recess next to the bolt head and an enlarged shank between the threads and the recess, where the outer diameter of the recess is smaller than a major diameter of the threaded bore of the nut and where an outer diameter of the shank is larger than a major diameter of the bolt threads, and a sleeve with a unthreaded bore positioned between the tapered ramp and the bolt head with one end crimped into the recess such that the internal diameter of the crimped sleeve bore is smaller than the major diameter of the threads on the bolt.

11 Claims, 10 Drawing Sheets

Related U.S. Application Data continuation-in-part of application No. 15/459,073, filed on Mar. 15, 2017, now Pat. No. 10,267,347.

(60) Provisional application No. 62/310,240, filed on Mar. 18, 2016.

(58) Field of Classification Search
CPC .............. F16B 19/1054; F16B 19/1063; F16B 19/1072; F16B 37/067
USPC ................. 411/34, 39, 43, 44, 55, 60.1–60.2
See application file for complete search history.

(56) References Cited

U.S. PATENT DOCUMENTS

| | | | | |
|---|---|---|---|---|
| 3,253,495 | A | 5/1966 | Orioff | |
| 3,262,353 | A | 7/1966 | Waeltz et al. | |
| 3,277,771 | A | 10/1966 | Reynolds | |
| 3,443,474 | A * | 5/1969 | Bergere | F16B 19/1063 411/41 |
| 4,033,222 | A | 5/1977 | Wilson | |
| 4,127,345 | A | 11/1978 | Angelosanto et al. | |
| 4,312,613 | A | 1/1982 | Binns | |
| 4,627,775 | A | 12/1986 | Dixon | |
| 4,659,271 | A | 4/1987 | Pratt | |
| 4,877,363 | A * | 10/1989 | Williamson | F16B 19/1063 411/34 |
| 5,030,050 | A | 7/1991 | Aurioi et al. | |
| 5,256,017 | A | 10/1993 | Smirnov et al. | |
| 5,498,110 | A | 3/1996 | Stencel et al. | |
| 6,036,418 | A * | 3/2000 | Stencel | F16B 19/1063 411/54.1 |
| 6,454,502 | B1 * | 9/2002 | Cosenza | F16B 5/02 411/34 |
| 6,547,500 | B2 * | 4/2003 | Cosenza | F16B 5/02 411/34 |
| 7,033,120 | B2 | 4/2006 | Hufnagl | |
| 8,322,015 | B2 | 12/2012 | Pratt | |
| 8,348,566 | B2 | 8/2013 | Pratt | |
| 8,777,533 | B2 * | 7/2014 | Hufnagl | F16B 19/1072 411/42 |
| 8,979,453 | B2 * | 3/2015 | Hufnagl | F16B 19/1054 411/42 |
| 9,212,678 | B2 | 12/2015 | Pratt | |
| 9,464,654 | B2 | 10/2016 | Pratt | |
| 2005/0201845 | A1 | 9/2005 | Keener | |
| 2006/0062650 | A1 | 3/2006 | Keener | |
| 2007/0243035 | A1 * | 10/2007 | Pratt | F16B 19/1054 411/39 |
| 2009/0016842 | A1 | 1/2009 | Auriol et al. | |
| 2011/0182689 | A1 | 7/2011 | Avetisian | |
| 2012/0180279 | A1 * | 7/2012 | Tuery | F16B 19/1072 29/243.53 |
| 2013/0061451 | A1 * | 3/2013 | Pratt | F16B 19/1072 411/34 |
| 2013/0061452 | A1 | 3/2013 | Pratt | |
| 2014/0044498 | A1 * | 2/2014 | Hufnagl | F16B 19/1054 411/43 |
| 2015/0010370 | A1 * | 1/2015 | Pratt | F16B 19/1063 411/43 |

OTHER PUBLICATIONS

European Patent Office, European Search Report, EP 17160089 dated Jan. 18, 2018.

* cited by examiner

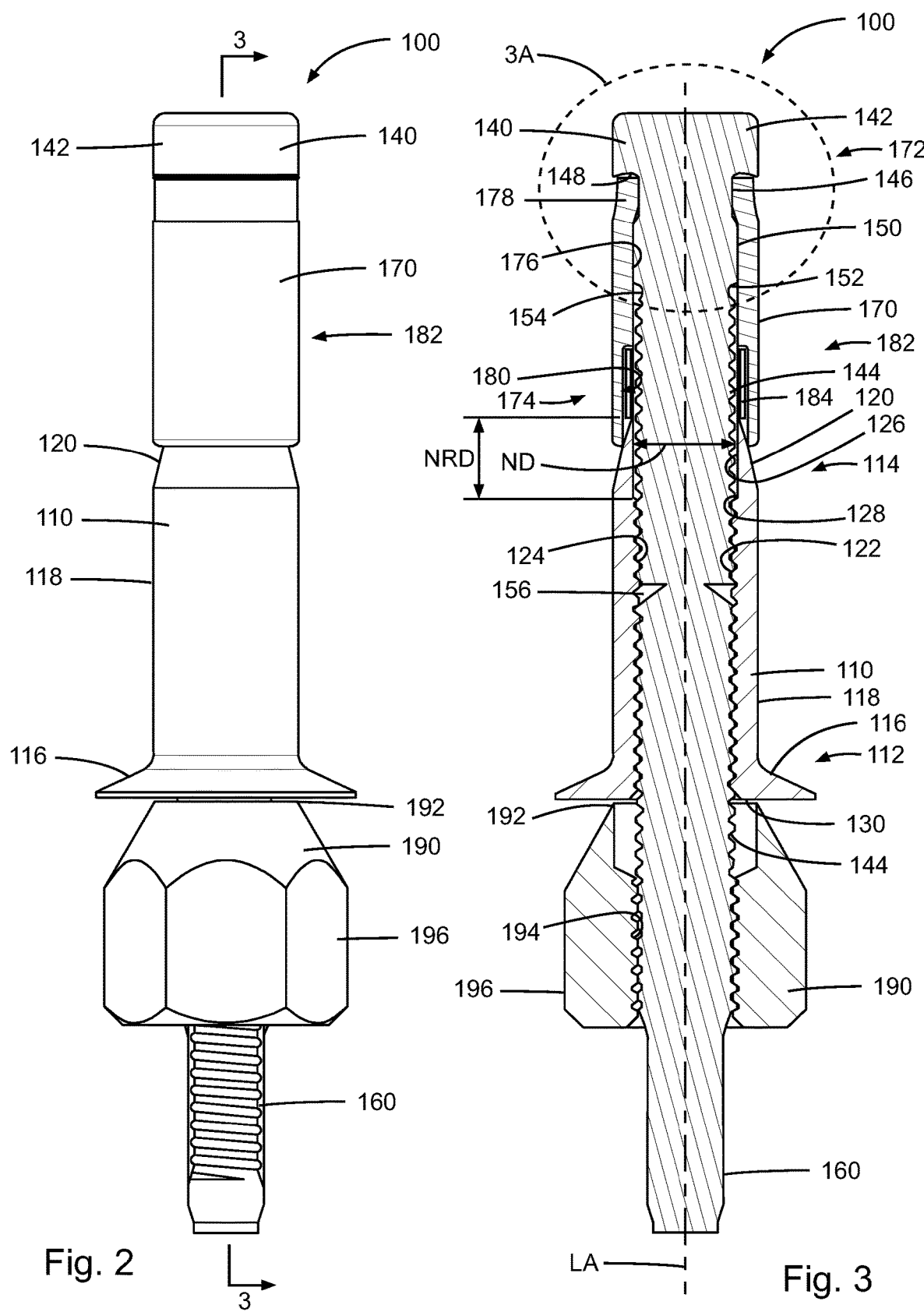

BLIND FASTENER

CROSS-REFERENCE TO RELATED APPLICATIONS

This application claims the benefit of and is a continuation of U.S. application Ser. No. 16/390,557, filed on Apr. 22, 2019, which claims the benefit of and is a continuation-in-part of U.S. application Ser. No. 15/459,073, filed in Mar. 15, 2017, now U.S. Pat. No. 10,267,347, which claims the benefit of U.S. Provisional Application No. 62/310,240, filed Mar. 18, 2016, the entireties of which are hereby incorporated by reference.

BACKGROUND

The present disclosure relates to blind fasteners having a large bearing surface on the blind side of the structure after installation.

The Composi-Lok® fastener, sold by Monogram Aerospace Fasteners (Applicant), has been in use for over 30-years. The Composi-Lok® fastener is a blind fastener that provides a large blind side upset that distributes bearing loads over a larger area, which has proven useful in modern aircraft manufacture that makes extensive use of composite laminates. Composite laminates are capable of sustaining high loads but are subject to delamination when fastened with some conventional fasteners that do not adequately distribute bearing loads. By providing a large blind side upset Composi-Lok® fasteners distribute bearing loads over a large area overcoming damage to the composite. The characteristic large blind side bearing area or "footprint" allows the fastener to impart very high clamp loads to the structure without damage to the composite laminate. This also facilitates an installed fastener that retains a high preload on the fastened joint. The original Composi-Lok® fastener is described in U.S. Pat. No. 4,457,652, issued Jul. 3, 1984 to John D. Pratt Since the introduction of the Composi-Lok® fastener, this fastener has been modified to change different performance characteristics. The original Composi-Lok® fastener did not use a drive nut and accommodated up to 0.050" stack up range. The installed break-off tolerance was −0.000"/+0.103". The first change was the Composi-Lok II® fastener that added a hex drive nut. Next, the Composi-Lok IIa® fastener was developed to provide an increased effective functional grip range. While the stack up range was still 0.050", the IIa fastener provided the required mechanical properties even if the stack up was exceeded by 0.025" over grip or 0.025" under grip (providing an effective 0.100" operational range). The Composi-Lok IIa® fastener included modifications to the nose angle of the nut and also modified the length of the sleeve, which both increased blind side protrusion which also increased fastener weight.

The next development was the Composi-Lok 3® fastener which added finer frictional control of screw rotation to achieve a narrow break-off tolerance: +0.000"/−0.030". The Composi-Lok 3® fastener is also known as the Flush Break Composi-Lok fastener. The Composi-Lok 3® fastener was based on the lengthened Composi-Lok IIa® fastener with the same consequence of added weight and increased blind side protrusion. This was followed by the Composi-Lite® fastener that replaced the standard A286 SS screw in a Flush Break Composi-Lok fastener with a titanium screw for installed weight savings.

The object of the improved fasteners disclosed herein is to improve several characteristics of the Composi-Lok® family of fastener while maintaining the characteristic large blind side upset, installed pre-load and the resultant characteristic performance. While these improvements are directed to the Composi-Lok® family of fastener, it should be understood that these improvements could be applied to other types of fasteners and it is not intended that the claims presented below be limited to Composi-Lok® type fasteners.

One object of the present disclosure is a blind fastener that consistently provides a flush to below flush break-off after installation to eliminate secondary shaving, milling or grinding operations to meet aerodynamic flushness requirements.

Another object of the present disclosure is to provide a reduced weight blind fastener that provides the same performance as the original Flush Break Composi-Lok® fastener.

Yet another object of the present disclosure is to provide a blind fastener that protrudes less on the blind side compared to the original Flush Break Composi-Lok® fastener.

Another object of the present disclosure is to provide a blind fastener having a titanium nut and bolt that has a break-off tolerance comparable to a bolt manufacture from A286 stainless steel.

A further object of the present disclosure is to provide a blind fastener that includes a positive mechanical lock that restricts disassembly after installation.

BRIEF DESCRIPTION OF THE DRAWINGS

FIG. 2 is a side elevational view of a first embodiment of an improved blind fastener.

FIG. 3 is a cross sectional view of the FIG. 2 large upset blind fastener taken along lines 3-3.

DETAILED DESCRIPTION

Figures 1A, 1B:
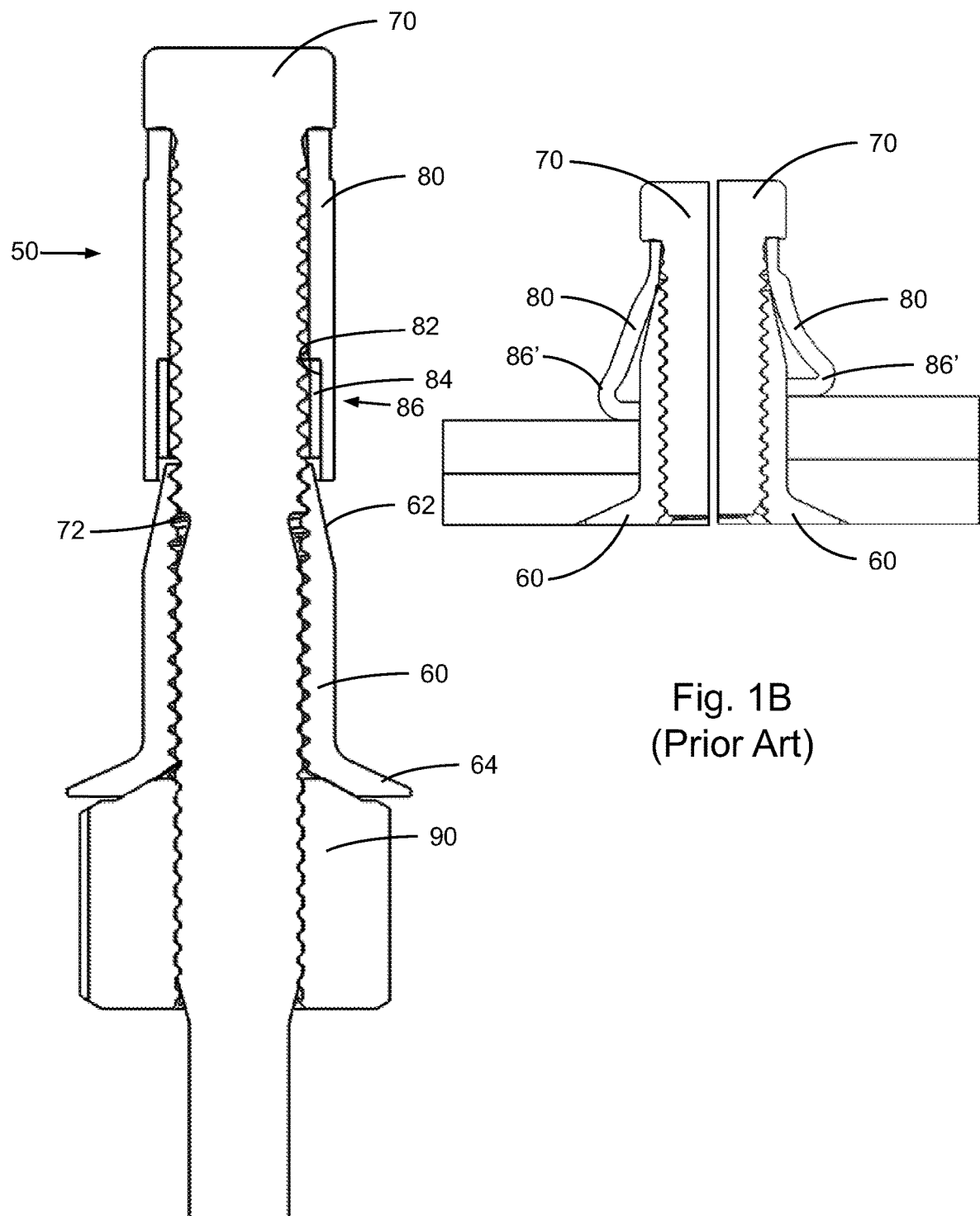
FIG. 1A is a cross sectional side view of a prior art blind fastener.
FIG. 1B is a cross sectional side view of the FIG. 1A prior art blind fastener in minimum/maximum installed conditions.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

Described is a fastener comprising: a nut that defines an nut bore through said nut along a longitudinal axis, wherein said nut comprises a nut head on a first end comprising three recesses formed from the first end through the nut head and to the nut bore, a cylindrical outer surface and an external tapered ramp surface on a second end; a bolt comprising a bolt head, a first recess adjacent said bolt head, and an enlarged shank positioned between said externally threaded portion and said first recess, wherein an outer diameter of said first recess is smaller than a major diameter of said nut bore, wherein an outer diameter of said enlarged shank is larger than a major diameter of said externally threaded portion; and a sleeve defining a sleeve bore, wherein said sleeve is positioned between said external tapered ramp surface and said bolt head over said bolt with a first end crimped into said first recess such that an internal diameter of said sleeve bore at said first end is smaller than the major diameter of said externally threaded portion. The nut bore comprises an internally threaded portion and an unthreaded cylindrical recess extending from said second end toward said first end, wherein an internal diameter of said unthreaded cylindrical recess is larger than an outer diameter of said enlarged shank. An axial length of said unthreaded cylindrical recess has a different axial length than said enlarged shank. The bolt further comprises a second recess positioned between said enlarged shank and said externally threaded portion, and wherein an outer diameter of said second recess is smaller than a minor diameter of said externally threaded portion. The nut head further comprises three unrecessed portions positioned between said three recessed portions. The bolt further comprises a break groove, wherein said break groove is positioned to break substantially flush with said unrecessed portions. The enlarged shank defines a stop shoulder that interfaces with said nut to block movement of said bolt relative to said nut when said break groove is positioned substantially flush with said unrecessed portion. The three recessed portions operatively interact with a drive nut during installation of said fastener. The three recessed portions are generally equally spaced from each other. The three recessed portions are generally the same size and shape. The nut head may comprise a generally frustoconical tapered shape. In another example, the nut head may comprise a generally hexagonal shape. It is noted that other embodiments may include a nut head that protrudes from a work piece when installed.

Also described is a fastener comprising a nut that defines an nut bore through said nut along a longitudinal axis, wherein said nut comprises a nut head on a first end, a second end, an unthreaded cylindrical recess extending from said second end toward said first end, and a first shoulder in said cylindrical bore positioned between said internal threads and said unthreaded cylindrical recess, wherein said first end comprises a generally planar surface and three recesses formed from said planer surface about an opening to the nut bore; a bolt comprising a bolt head, an externally threaded portion, a shank positioned between said externally threaded portion and said bolt head and a second shoulder on said shank, wherein an outer diameter of said shank is larger than a major diameter of said nut bore, and wherein an outer diameter of said shank is smaller than an internal diameter of said unthreaded cylindrical recess; and a sleeve defining an sleeve bore, wherein said sleeve is positioned between said nut and said bolt head about said bolt, wherein said sleeve is operatively deformed to form an upset portion during installation. The nut comprises and an internally threaded cylindrical bore through said nut along a longitudinal axis. The internally threaded cylindrical bore comprises a thread start proximal the first end that intersects with at least one of the three recesses. The thread start intersects with only one of the three recesses. The first end comprises a generally annular opening to the internally threaded cylindrical bore and an annular shoulder disposed between the planar surface and the annular opening.

At least one embodiment describes a fastener comprising a nut comprising a through bore through said nut, a first end comprising a head that comprises an opening to said through bore, a cylindrical outer surface, a second end comprising an external tapered ramp surface, an unthreaded cylindrical recess extending from said second end toward said first end, and a first shoulder in said cylindrical bore positioned between said through bore and said unthreaded cylindrical recess, wherein said head comprises a generally planar surface comprising three recesses formed through the generally planar surface about said opening to said through bore; a bolt comprising a bolt head, an externally threaded portion, an enlarged shank positioned between said externally threaded portion and said bolt head and a second shoulder on said enlarged shank, wherein an outer diameter of said enlarged shank is larger than a major diameter of said internally threaded cylindrical bore, wherein an outer diameter of said enlarged shank is smaller than an internal diameter of said unthreaded cylindrical recess; and a sleeve comprising an unthreaded cylindrical bore, wherein said bolt is positioned through said sleeve, and wherein said sleeve is positioned between said external tapered ramp surface and said bolt head, wherein said sleeve operatively forms a blind side upset when said bolt head applies force to said sleeve and wherein said first and second shoulders are adapted to abut and block further movement of said bolt relative to said nut when the blind side upset is fully formed. The planar surface further comprises three unrecessed portions disposed about said opening to said through bore and between said recessed portions. The planar surface further comprises three unrecessed portions disposed about said opening to said through bore and between said three recessed portions. The three recesses comprise generally angled or tapered bottom surfaces. In at least one embodiment, the sleeve may comprise an annular protrusion proximal to said bolt head when said sleeve is positioned between said external tapered ramp surface and said bolt head.

Referring to FIG. 1A, a prior art Composi-Lok 3® fastener is illustrated as fastener 50. Fastener 50 includes nut 60, bolt 70, sleeve 80 and drive nut 90. Nut 60 includes tapered end 62 and head 64, bolt 70 includes break groove 72. Sleeve 80 includes recess 82 holding insert 84 and defining deformable portion 86.

Referring to FIG. 1B, fastener 50 is illustrated in a minimum/maximum installed condition with sleeve 80 forming enlarged head 86' and bolt 70 fractured at break groove 72. Specifically, the left side of FIG. 1B illustrates half of fastener 50 installed in a minimum stack up installation and the right side of FIG. 1B illustrates the opposite half of fastener 50 installed in a maximum stack up installation.

The improved fastener disclosed below seeks to improve on the functionality of fastener 50 in several ways. First, by reducing the length of the fastener to reduce the weight of the fastener and to reduce the blind side clearance required during and after installation. Fastener 50 is typically quite small, but an individual aircraft can include thousands of fasteners. Reducing the length of the blind side of the fastener can reduce the weight of the fastener, which can be an important consideration where aircraft manufacturers are seeking to minimize the weight of their aircraft.

Reducing the length of the blind side of the fastener also reduces the clearance required for installation and increases the clearance available after installation. The shortened fastener can be installed in spaces too small for fastener 50 to function and after installation; the height of the blind side upset is reduced, reducing interference with other structures that may be located near the blind side of installed fastener 50. For example, the interior space in structures such as wings.

One commercial product corresponding to fasteners 50 is designed to operate in a 0.050 thousandths of an inch (1.27 mm) stack up range, meaning a 0.050 thousandths difference between the minimum and maximum stack up that a particular fastener 50 can be used with while providing an adequate blind side upset and the required preload. If a fastener is used in a stack up that is thicker than the rated maximum stack up, the blind side upset may deform too much, potentially reducing the pull-through force of the fastener or the preload of the fastener below design parameters. If a fastener is used in a stack up that is thinner than the rated minimum stack up, the blind side upset may not fully form, again potentially reducing the clamp up force of the fastener below design parameters and potentially reducing the size of the blind-side upset and the installed preload.

A second improvement compared to fasteners 50 is consistent post installation appearance. Fastener 50 includes break groove 72 that fractures bolt 70 after installation. In some situations, portions of bolt 70 may protrude beyond head 64. Some installations require aerodynamic flushness, so installations of fastener 50 can require secondary shaving, milling or grinding operations to meet flushness requirements. A second improved functionality of the fastener disclosed below is a design that consistently provides a flush to below flush break-off to eliminate secondary shaving, milling or grinding operations.

A third improvement compared to fastener 50 is consistent formation of the blind side upset. Fastener 50 relies on increasing the torque applied at a particular point in the installation to fracture break groove 72. When using some materials such as titanium for nut 60 and bolt 70, it can be difficult to fracture break groove 72 at a precise location in nut 60, compounding the flushness problem described above and resulting in inconsistencies in the amount of upset generated in sleeve 80. If break groove 72 fractures too soon, then upset 86' might not achieve the desired footprint and required preload. Conversely, if break groove 72 fractures too late, then upset 86' might over deform, again failing to achieve the desired footprint, the required preload, or bolt 70 could partially pull through sleeve 80, reducing the strength of the installed fastener. A third improved functionality of the fastener disclosed below is a design that provides a consistent upset geometry.

While some fasteners disclosed herein incorporate multiple improvements, these improvements are not dependent on each other, i.e., the improvements related to reduced length could be applied without the improvements related to more consistent break-off locations and vice versa.

Figure 3A:
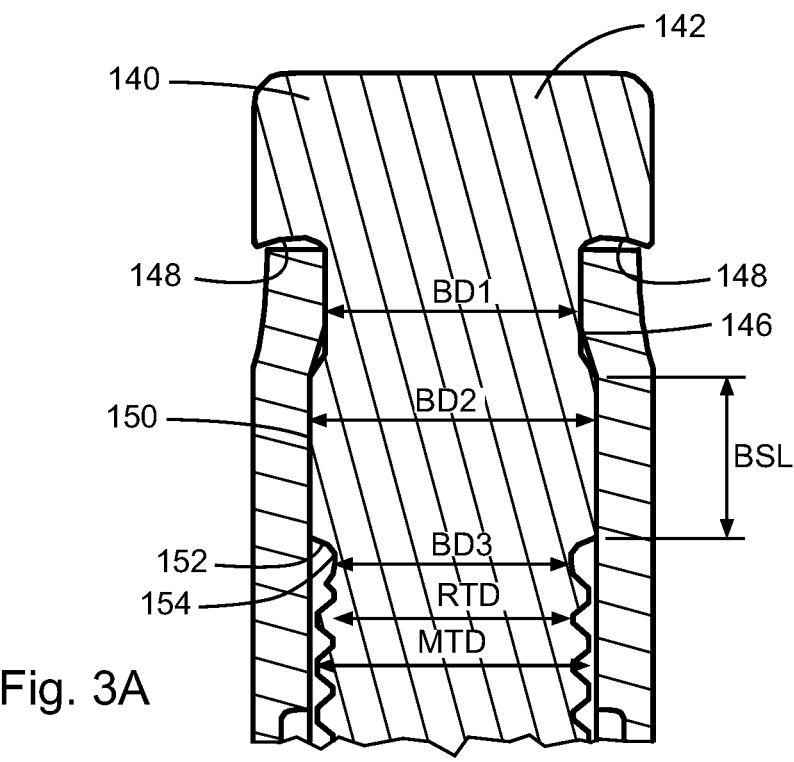
FIG. 3a is an enlarged cross sectional view of FIG. 3 taken along line 3-3.

Referring now to FIGS. 2-3a, fastener 100 is illustrated. Fastener 100 generally includes nut 110, bolt 140, sleeve 170 and drive nut 190. Fastener 100 defines longitudinal axis LA and is generally symmetric about longitudinal axis LA. These components correspond in general function to nut 60, bolt 70, sleeve 80 and drive nut 90 of fastener 50 described above (with additional improvements described below).

Nut 110 is a generally cylindrical body with first end 112 and second end 114 with a generally cylindrical outer surface 118 extending between the first and second ends 112 and 114. First end 112 includes head 116, and second end 114 includes tapered end 120 defining a generally frustoconical shape that tapers to a point. Nut 110 defines through bore 122 that is internally threaded with internal threads 124 and also defines internal unthreaded recess 126 defining shoulder 128 positioned in recess 126. Recess 126 defines a generally cylindrical shaped recess aligned with longitudinal axis LA in end 114. Recess 126 defines internal diameter ND and a longitudinal depth NRD.

It is noted that in some examples, the head 116 may comprise a protruding head that may, when installed, protrude from the nut. The profile of the protruding head may comprise different heights, and may include low-profile protruding heads. In another example, the head may comprise a hex head that comprises a generally hexagonal-shaped configuration. Other head shapes or configurations may be utilized in accordance with various disclosed embodiments.

Figures 8, 9:
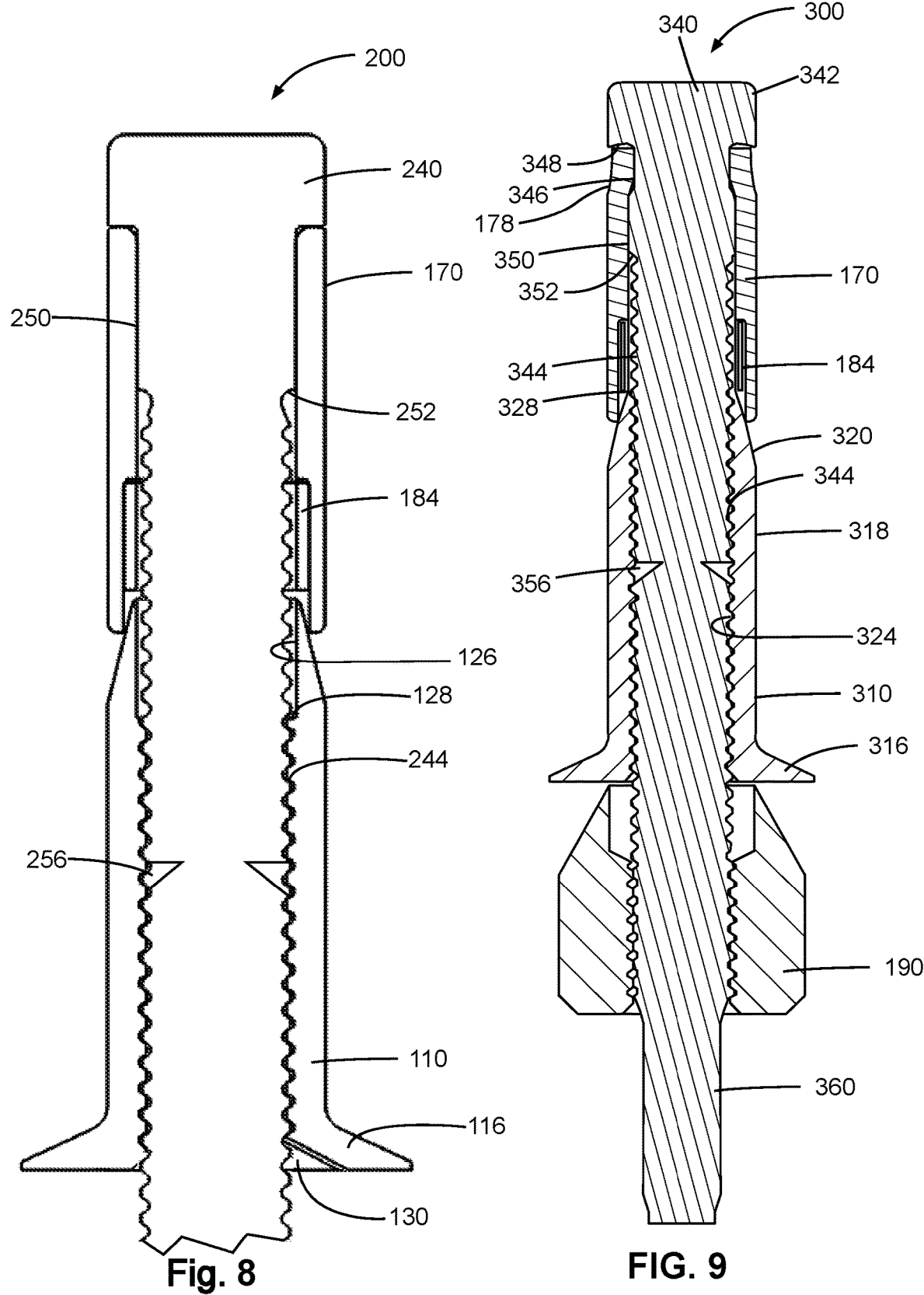
FIG. 8 is a cross sectional elevational side view of a second embodiment of an improved blind fastener.
FIG. 9 is a cross sectional side elevational view of a third embodiment of an improved blind fastener.

In the illustrated embodiment, head 116 is configured to fit within a countersunk recess in a workpiece and defines a generally frustoconical tapered head shape. Head 116 may also include wrenching surfaces 130 (as shown in FIG. 8) for engagement with a tool or with drive nut 190 as is well known in the art. In alternative embodiments (not illustrated), head 116 could be configured to protrude above a workpiece and wrenching surfaces 130 could be located on the external portions of head 116.

Bolt 140 includes head 142, threaded portion 144, recess 146, enlarged shank 150 and recess 154. Recess 146 is positioned adjacent head 142 with head 142 defining tapered abutment surface 148 on the side facing threaded portion 144 (with tapered abutment surface 148 defining one side of recess 146). Enlarged shank 150 is adjacent recess 146. Recess 154 is positioned between enlarged shank 150 and threaded portion 144 with enlarged shank 150 defining shoulder 152 adjacent recess 154. Bolt 140 also includes break groove 156 and wrenching surfaces 160 opposite head 142.

Threaded portion 144 has major thread diameter MTD and minor thread diameter RTD. Recess 146 has an outer diameter BD1 that is smaller than major thread diameter MTD. Enlarged shank 150 has an outer diameter BD2 that is larger than major thread diameter MTD. Enlarged shank 150 also has a longitudinal length BSL that, in the illustrated embodiment, is shorter than longitudinal depth NRD of nut 110. Recess 154 has an outer diameter BD3 that is smaller than minor thread diameter RTD. Internal diameter ND of recess 126 is larger than outer diameter BD2 on enlarged shank 150. Recess 154 provides a gap between threaded portion 144 and shoulder 152 that can accommodate debris, such as from manufacturing or external contaminates after manufacturing, to limit any impact debris might cause on the performance of shoulder 152 as described below.

While enlarged shank 150 is illustrated as a cylindrical feature with a continuous smooth wall, it should be understood that the smooth outer wall is not required. For example, shank 150 could optionally define one or more grooves located radially, axially or helically. Such grooves could be useful to further reduce the weight of fastener 100.

Sleeve 170 includes end 172 and end 174 with cylindrical bore 176 and an enlarged bore portion 180 on end 174 and crimped portion 178 on end 172 with enlarged bore portion 180 defining deformable portion 182. Sleeve 170 may include insert 184 positioned within enlarged bore portion of deformable portion 182. If insert 184 is included, it may be positioned with a tip of tapered end 120 positioned slightly within insert 184 to promote insert 184 passing over tapered end 120 upon installation.

Drive nut 190 includes engaging portion 192, internally threaded portion 194 and wrenching surfaces 196. Engaging portion 192 is configured to interface with wrenching surface 130 to rotationally constrain drive nut 190 and nut 110 together.

Fastener 100 is assembled by placing sleeve 170 over bolt 140 and threading nut 110 onto bolt 140 with sleeve 160 positioned between tapered end 120 and head 142, as illustrated. With end 172 abutting tapered abutment surface 148, end 172 of sleeve 170 is crimped or cold worked into recess 146 of bolt 140 thereby defining crimped portion 178. This entraps sleeve 170 onto bolt 140 and restrains sleeve 170 from moving axially relative to bolt 140.

Fastener 100 is configured such that shoulder 128 abuts shoulder 152 after formation of the desired blind side upset. This defines a predefined longitudinal location at which nut 110 stops propagating relative to bolt 140 permitting break groove 156 to be precisely located axially on bolt 140 such that it is flush or slightly below flush with head 116 after fracture after installation. This provides a positive stop that may reduce the required manufacturing tolerances as increased installation torque will not cause excessive deformation of the blind side upset. This permits the design break torque for break groove 156 to be incrementally higher (compared to break groove 72) to ensure that the blind side upset is consistently fully formed with the required preload applied prior to break groove 156 fracturing. Furthermore, recess 154 may help provide consistent spacing of shoulder 152 relative to shoulder 128 when nut 110 travels beyond threaded portion 144 so that shoulder 128 consistently reaches shoulder 152. Recess 154 provides a volume that can accommodate debris, such as what may be formed when rolling threaded portion 144, from interfering with the repeatable positioning of the interface between shoulder 128 and shoulder 152.

Another benefit of the positive stop provided by shoulders 128 and 152 is it permits use of titanium bolts and nuts while maintaining a tight break-off tolerance. Titanium bolts and nuts are prone to galling and require a comparatively higher torque to tighten compared to A286 nuts and bolts (using identical sleeves). The higher resultant installation torque makes fine control of break off positioning difficult using prior techniques. Using the positive stop disclosed herein, Applicant has maintained a relatively tight 0.030" installed break-off tolerance (compared to a 0.103" tolerance using prior techniques). This permits a further weight savings for a flush break blind fastener, as titanium is significantly lighter than A286 SS.

Figure 4:
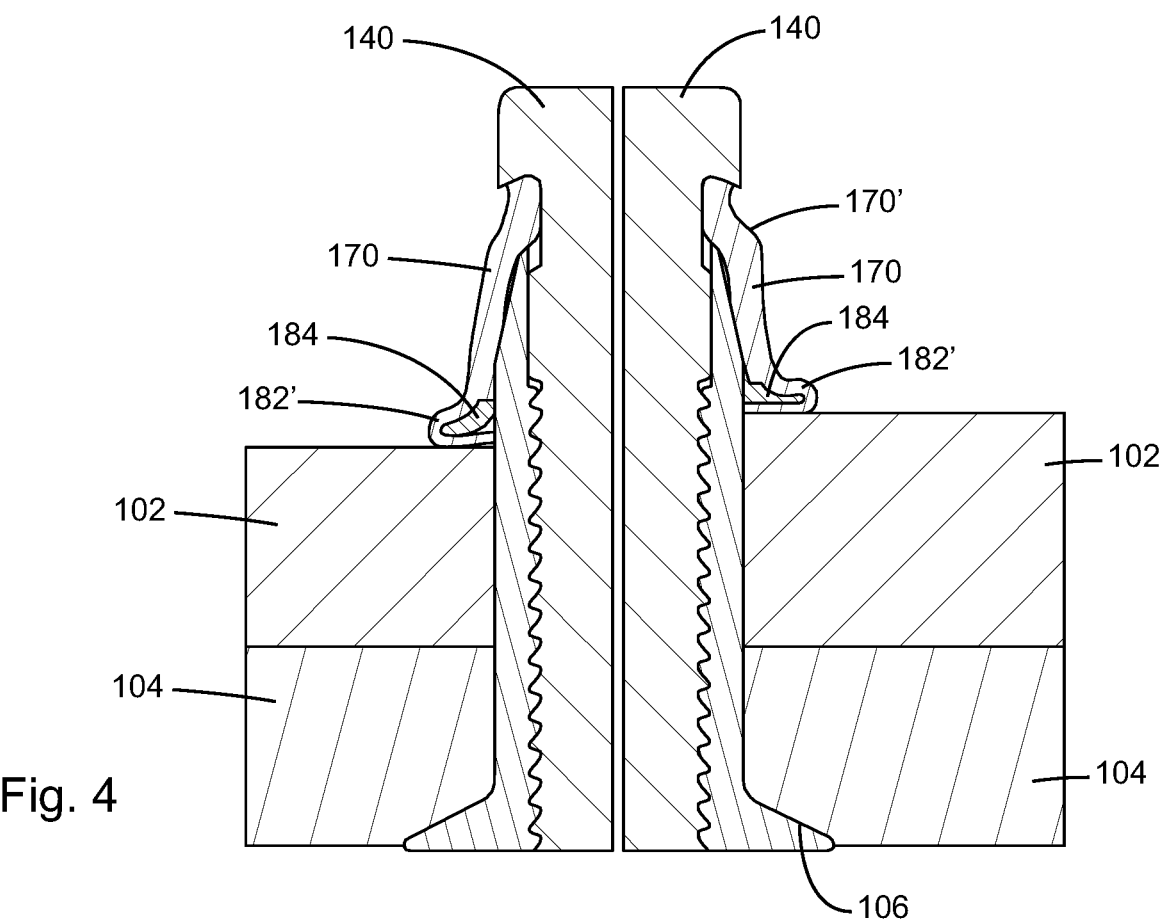
FIG. 4 is a cross sectional view of the FIG. 2 large upset blind fastener showing finite element analysis of the installation of the fastener in both minimum and maximum stack up conditions.

Referring now to FIG. 4, the minimum and maximum installed configuration of fastener 100 are illustrated. The left side of FIG. 4 illustrating a minimum stack up configuration and the right side of FIG. 4 illustrating a maximum stack up configuration. Stack up configuration refers to the thickness of work pieces 102 and 104 through which fastener 100 is installed. As shown in FIG. 4, deformable portion 182 deforms into blind side upset 182' upon installation. As shown on the right side of FIG. 4, sleeve 170 also forms bulge 170' in a maximum stack up installation that is not present in a minimum stack up installation.

Figure 5:
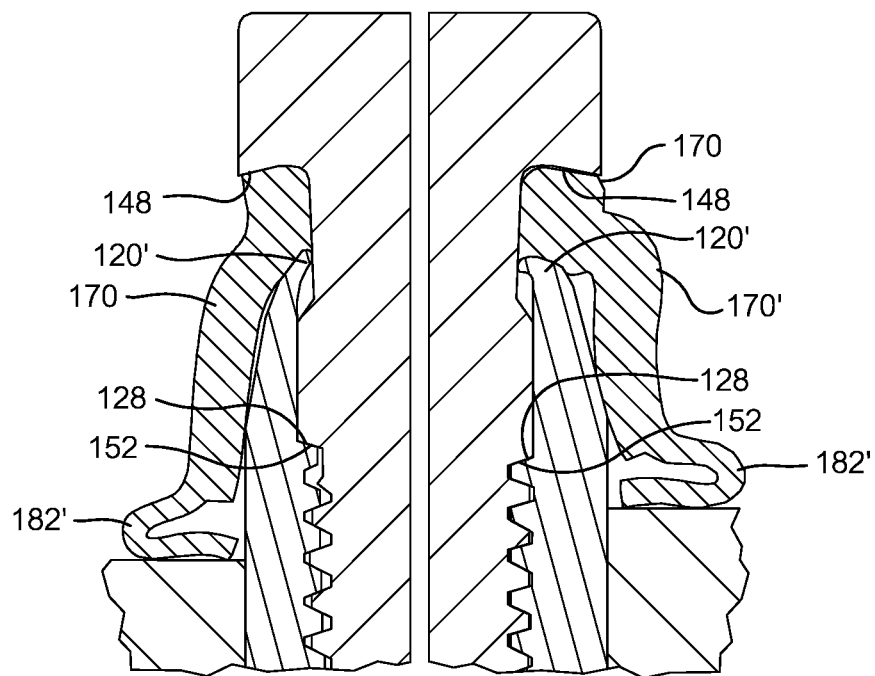
FIG. 5 is a cross section of installed fasteners in a minimum and maximum stack up condition.

Referring now to FIG. 5, a cross section of installed fasteners 100 is shown. FIG. 5 again shows a minimum stack up configuration on the left side and maximum stack up configuration on the right side. In both the minimum and maximum stack up installation, tapered end 120 of nut 110 is deflected inwardly forming deformed tip 120' with the maximum installed configuration having a more pronounced deformed tip 120' compared to the minimum installed configuration on the left side. It is noteworthy that in both conditions that deformed end 120' defines a smaller diameter than outer diameter BD2 of enlarged shank 150. This installation feature potentially would prevent the separation of nut 110 from bolt 140 after installation. This could be considered advantageous because if nut 110 were able to back out, it could become debris that could damage the structure to which it is mounted, such as an engine where fastener 100 were installed in an engine cowling. Thus, when tapered 120 of nut 110 deforms inwardly and forms deformed end 120', this may advantageously create a mechanical interlock between nut 110 and bolt 140.

Formation of deformed end 120' requires that longitudinal depth NRD of recess 126 in nut 110 is longer than longitudinal length BSL of enlarged shank 150 so that tapered end 120 extends at least partially over recess 146 at the end of installation. This is an optional characteristic. While not specifically illustrated, longitudinal depth NRD of recess 126 may optionally be shorter than longitudinal length BSL of enlarged shank 150.

Referring briefly to FIG. 1b, the relative length of sleeve 80 is longer in FIG. 1b prior art fastener compared to sleeve 170 shown in FIGS. 4-5. This represents making sleeve 170 shorter than sleeve 80 for the same diameter fastener. The reduction in length is from the portion of the sleeve that always overlaps the bolt in FIG. 1B. So, comparing installed fastener 50 to installed fastener 100, upon installation the head of the bolt is closer to the nut in fastener 100 compared to fastener 50. That difference in distance represents shortening of both the sleeve 170 and bolt 140 and the associated reduction in the weight of the fastener.

The additional length in the prior art fastener 50 provided at least two performance characteristics. First, it provided a region of sleeve 80 that was not deformed outwardly over the tapered end of nut 60 and so was predisposed to be retained on the head of bolt 70 rather than having bolt 70 pulled through. Furthermore, providing a longitudinal distance for deformation of sleeve 80 provides some space for sleeve 80 to compress to account for maximum stack up configurations facilitating the aforementioned 0.050 inch stack up range. Shortening sleeve 170 compared to sleeve 80 is facilitated by the configuration of the components described above such that sleeve 170 is preferentially retained by tapered abutment end surface 148 and is predisposed to buckle outwardly and form bulge 170' on maximum stack up thickness installations while maintaining the identical range of 0.050 inch total stack up range for individual fasteners and also avoiding over-compressing upset 182' in maximum stack up installations. Furthermore, Applicant has found that the disclosed configuration has helped create a more consistent crimp process. Prior Composi-Lok® fasteners included crimping on the distal end of the sleeve. However, the particular amount of crimping applied was often manipulated to modify the performance of individual fasteners. The disclosed fastener performs adequately without manipulating the applied crimp, resulting in more consistent manufacturing.

FIG. 5 again shows the formation of bulge 170' in the maximum stack up configuration on the left side of FIG. 5. While there is no equivalent bulge apparent in the minimum installed configuration shown on the left side of the FIG. 5. Applicant has determined that the configuration of sleeve 170 with crimped portion 178 crimped into recess 146 promotes the formation of bulge 170' during deformation. This is considered advantageous because the preferential formation of bulge 170' occurs instead of potential failure modes such as sleeve 170 starting to be pulled over head 142 or blind side upset 182' excessively deforming or the installed preload not meeting the requirement for the fastener. Applicant has determined that fastener 100 with bulge 170' meets all the necessary performance requirements including installed preload.

By comparison, referring to FIG. 1B, there are differences between the minimum and maximum blind side upsets 86'. Specifically, blind side upset 86' in the maximum stack up condition (right side) has a slightly larger diameter than blind side upset 86' in the minimum stack up condition (left side). While fastener 50 illustrated in FIG. 1B meets all performance requirements through its entire specified installation range, including both minimum and maximum stack up conditions, it appears that fastener 100 may be more consistent, with less variance between the performance in minimum and maximum stack up conditions.

Figure 6:
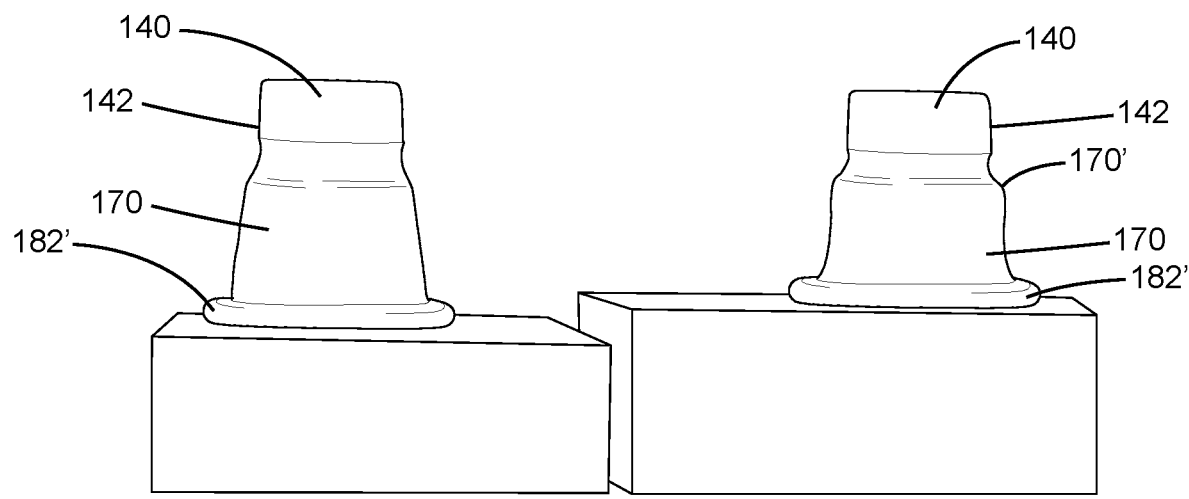
FIG. 6 two installed large upset blind fasteners one in a minimum stack up and the other in a maximum stack up.

Referring now to FIG. 6 is a side elevational view of the blind side of installed fastener 100 are shown in minimum and maximum stack up configurations, with the left side showing the minimum stack up blind side upset and the right side showing the maximum stack up blind side upset. The specimens shown in FIG. 6 are the specimens that were cut in half to produce the cross sectional views shown in FIG. 5. Once again, bulge 170' is apparent in the maximum stack up blind side upset and is missing from the minimum stack up blind side upset.

Figure 7:
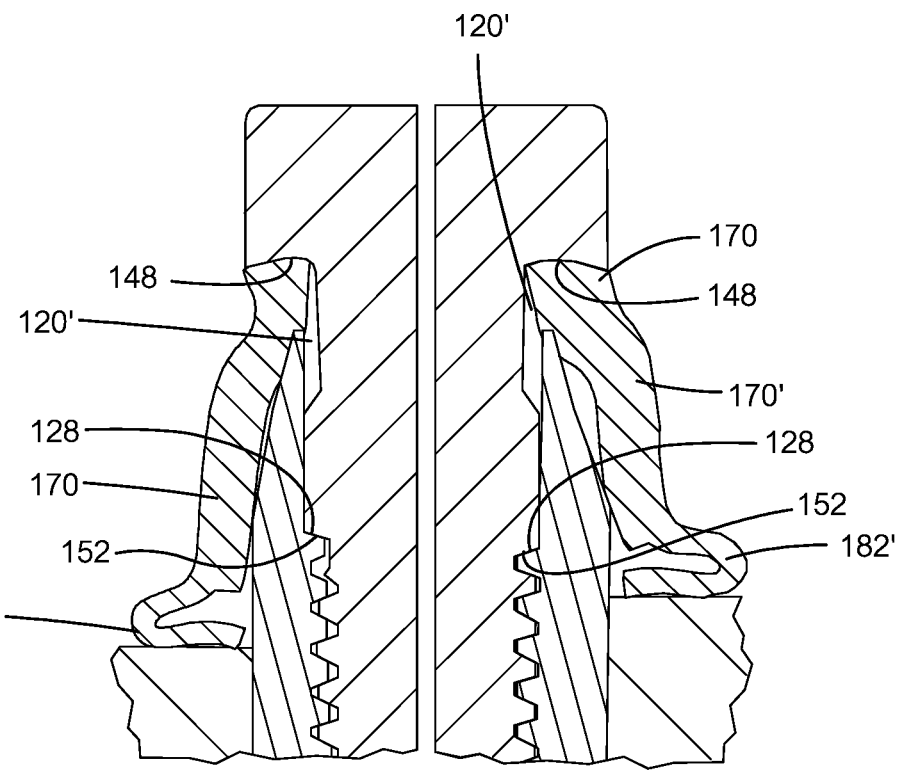
FIG. 7 is a cross sectional view of installed large upset blind fasteners of FIG. 2 showing alternate deformation of internal components.

Referring to FIG. 7, an alternative deformation of fastener 100 is illustrated. In some instance, such as where the nut counter bore depth NRD is shorter than what is disclosed in nut 110, instead of tapered end 120 deflecting inwardly upon contact with sleeve 170 as illustrated in FIG. 5, tapered end 120 may alternatively embed into sleeve 170. In the illustrated deformation, sleeve 170 becomes entrapped between tapered end 120 and tapered abutment surface 148, further securing sleeve 170 in the illustrated position.

Referring to FIG. 8, a second embodiment of a blind fastener is illustrated as fastener 200. Fastener 200 generally includes nut 110, insert 184, bolt 240 and sleeve 170. Fastener 200 does not utilize a drive nut, although one could optionally be added as is well known in the art. Nut 110 and sleeve 170 generally conform to nut 110 and sleeve 170 described above with regard to fastener 100.

Bolt 240 includes shank 250, threaded portion 244, shoulder 252 and break groove 256. Fastener 200 is configured such that shoulder 128 abuts shoulder 252 after formation of the desired blind side upset. This defines a predefined longitudinal location at which nut 110 stops propagating relative to bolt 240 permitting break groove 256 to be precisely located axially on bolt 240 such that it is flush or slightly below flush with head 116 after fracture after installation.

Referring to FIG. 9, a third embodiment of a blind fastener is illustrated as fastener 300. Fastener 300 generally includes nut 310, bolt 340, sleeve 170 and drive nut 190. Sleeve 170 and drive nut 190 generally conform to sleeve 170 and drive nut 190 described above with regard to fastener 100.

Nut 310 is a generally cylindrical body with a generally cylindrical outer surface 318. One end of nut 310 includes head 316, and the other end includes tapered end 320 that defines a generally frusto-conical shape that tapers to point 328. Nut 310 defines a through bore that is internally threaded with internal threads 324.

In the illustrated embodiment, head 316 is configured to fit within a countersunk recess in a workpiece and defines a generally frusto-conical tapered head shape. Head 316 may also include wrenching surfaces (not illustrated) for engagement with a tool or with drive nut 190 as is well known in the art. In alternative embodiments (not illustrated), head 316 could be configured to protrude above a workpiece and wrenching surfaces 330 could be located on the external portions of head 316.

Bolt 340 includes head 342, threaded portion 344, recess 346, enlarged shank 350 and shoulder 352. Recess 346 is positioned adjacent head 342, with head 342 defining tapered abutment surface 348 on the side facing threaded portion 344 (with tapered abutment surface 348 defining one side of recess 346). Enlarged shank 350 is adjacent recess 346. Enlarged shank 350 defines shoulder 352 adjacent threaded portion 344. Bolt 340 also includes break groove 356 and wrenching surfaces 360 opposite head 342.

Fastener 300 may be configured such that point 328 abuts shoulder 352 after formation of the desired blind side upset. This defines a predefined longitudinal location at which nut 310 stops propagating relative to bolt 340 permitting break groove 356 to be precisely located axially on bolt 340 such that it is flush or slightly below flush with head 316 after fracture after installation. Another alternative configuration is when the nut includes an unthreaded cylindrical recess (e.g., internal unthreaded recess 126 of FIG. 8) that is shorter than the axial length of the enlarged shank (e.g., enlarged shank 350) of the screw such that the tapered end of the nut would never extend over recess 346.

Figure 10:
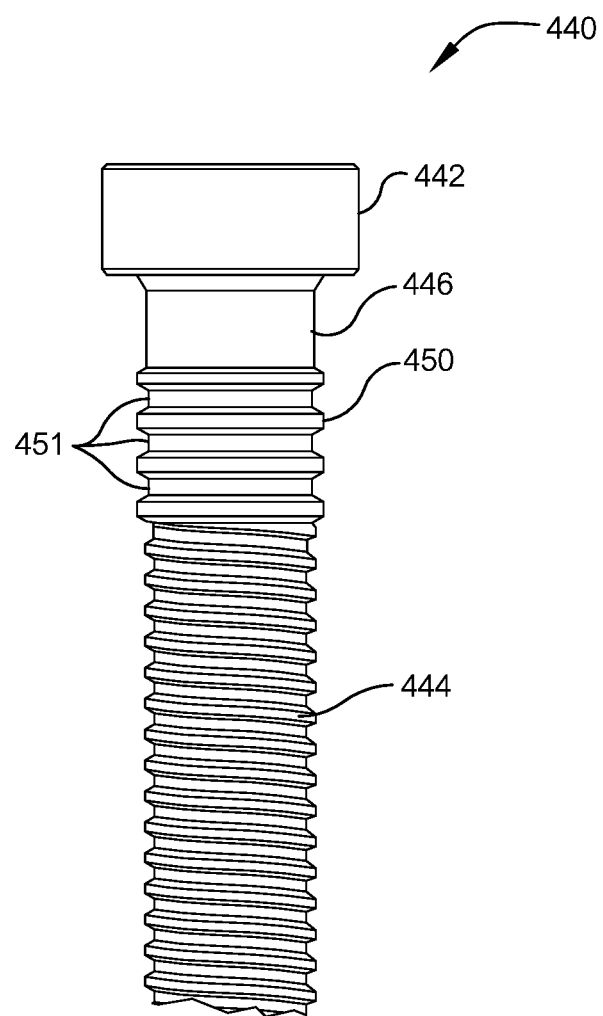
FIG. 10 is a side elevational view of an alternative embodiment of a bolt.

Referring to FIG. 10, bolt 440 is illustrated. Bolt 440 includes head 442, threaded portion 444, recess 446, enlarged shank 450 and grooves 451. Recess 446 is positioned adjacent head 442. Enlarged shank 450 is adjacent recess 446 and includes a plurality of grooves 451. In the illustrated embodiment, grooves 451 are oriented radially around enlarged shank 550 and are spaced apart. Grooves 451 may provide some weight savings without adversely impacting the performance of a blind fastener that utilizes bolt 440. It should be understood that grooves 451 may be configured differently, including, but not limited to, along the axial length of enlarged shank 450 or in a helical spiral around enlarged shank 450. While not illustrated, bolt 440 may also include a break groove and a wrenching surfaces opposite head 442 similar to bolt 140. While not illustrated in conjunction with bolts 140, 240 or 340, it should be understood that grooves 451 may be added to enlarged shanks 150, 250 or 350 as desired.

The bolts described herein may be made from materials including, but not limited to, titanium alloy, A-286, and the like, and combinations thereof. Optionally, other materials may be satisfactory depending on the application. The wrenching flats or surfaces for the bolts (drive nuts) herein are made for engagement by an installation tool. During manufacture, once the bolt is heat treated and cleaned, the bolt should be lubricated with dry film lubricant (for example, a molybdenum disulfide lubricant in a phenolic binder that is dry to the touch) to reduce friction at an interface between threaded portions of the bolt and the nut.

The sleeves of the present disclosure may be made from any malleable metal, for example, annealed AISI 304 stainless steel. Dry film lubricant may be applied to an inner surface of the sleeves to reduce friction. The sleeves may be formed by progressive forging operations or by machining from bar stock. The sleeves may alternatively be produced by machining alone. Crimping the sleeve onto the bolt may be performed with standard slotted collets as commonly used in lathe equipment or with collet crimpers. Alternatively, swaging may be performed by pushing the sleeve and bolt assemblies through a sizing die.

In at least one embodiment, sleeve 670 may be utilized with the disclosed nuts and bolts. The sleeve 670 may comprise first end 672 and a second end 674. The sleeve 670 may define a bore 676 that may be cylindrical and an enlarged bore 680 that may be cylindrical. It is noted that the internal perimeter of the enlarged bore 680 may be generally larger or greater than the internal perimeter of the bore 676. The enlarged bore portion 680 defines a deformable portion 682 that may be deformed into a blind side upset upon installation, similar to blind side upset upon 182'. It is further noted that sleeve 670 forms a bulge (e.g., similar to bulge 170') in a maximum stack up installation that is not present in a minimum stack up installation.

With end 672 abutting a tapered abutment surface of a bolt head (e.g., tapered abutment surface 148), end 672 of sleeve 670 may comprise a bulge or protrusion 678 that may interface with the tapered abutment surface. It is noted that the protrusion 678 may comprise a generally curved protrusion about the annular outer surface of the first end 672. This entraps sleeve 670 onto a bolt (e.g., bolt 140) and restrains sleeve 670 from moving axially relative to the bolt. While shown as a curved or bubble portion, the protrusion 678 may comprise other shapes or sizes, such as angled, chamfered, or other configurations.

Figure 14:
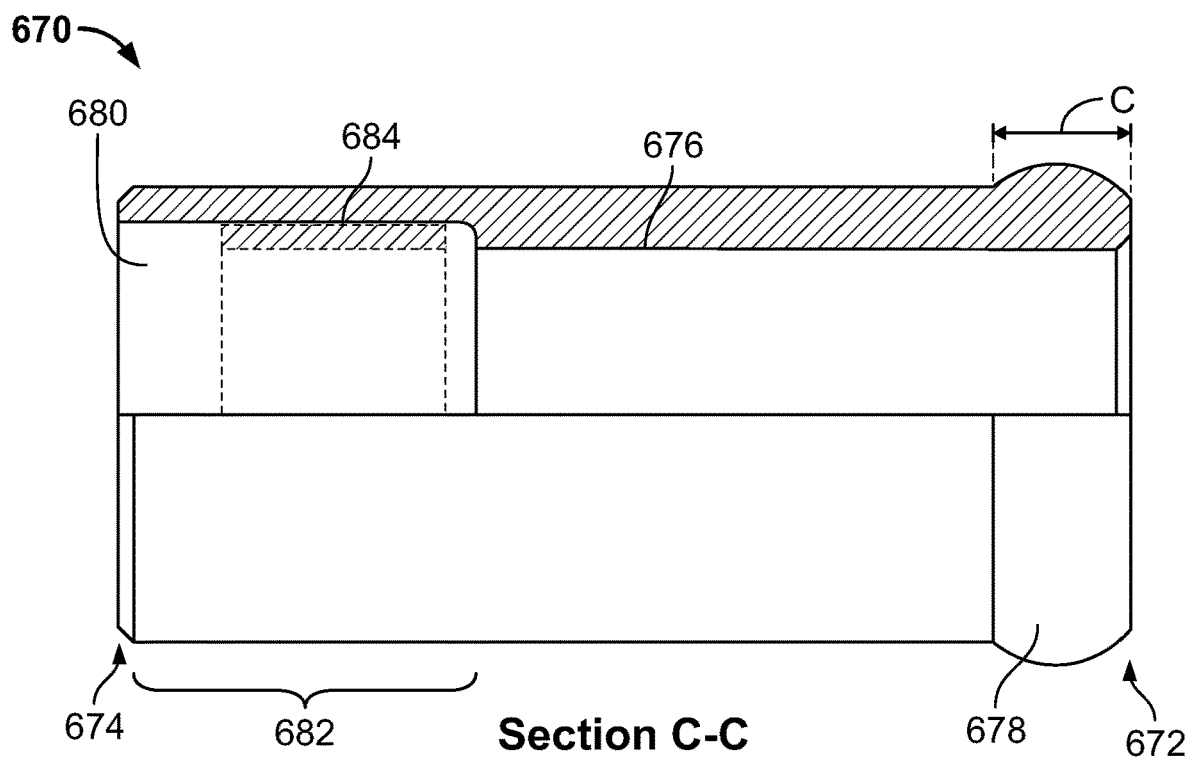
FIG. 14 is a top plan view of a sleeve comprising a protrusion.
Figure 15:
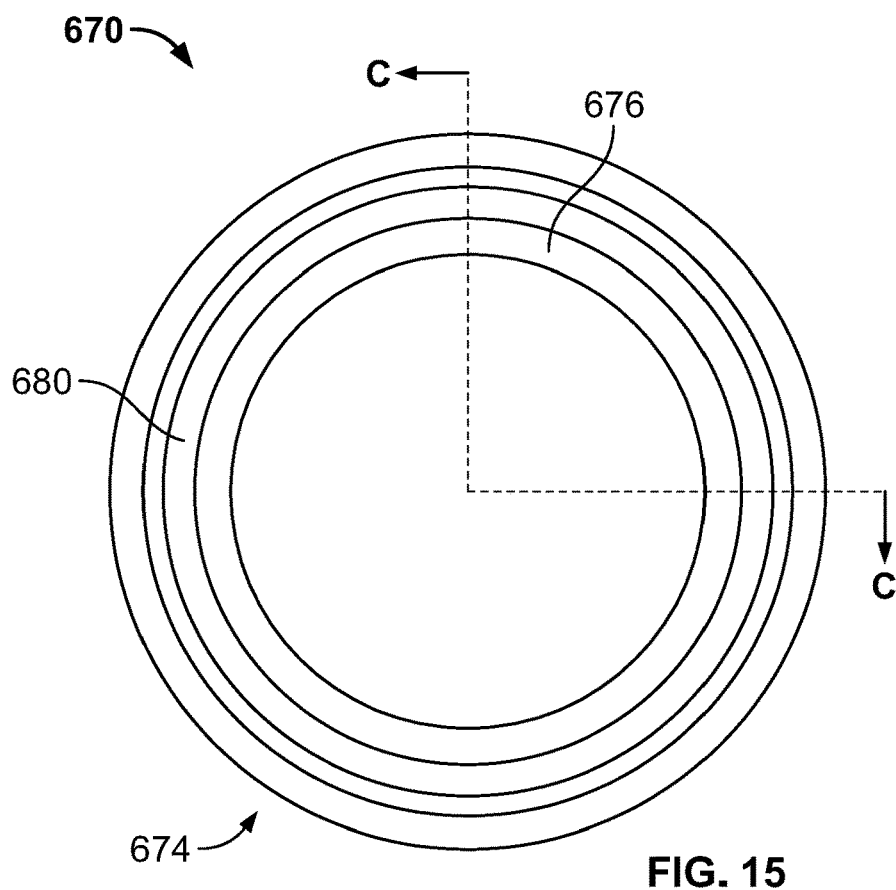
FIG. 15 is a side, partial cross-sectional view of the sleeve of FIG. 14 taken along line C-C.

Referring to FIG. 1b, the relative length of sleeve 80 is longer in than the sleeve 670 shown in FIGS. 14-15. This represents making sleeve 670 shorter than sleeve 80 for the same diameter fastener. The reduction in length is from the portion of the sleeve that always overlaps the bolt in FIG. 1B. So, comparing installed fastener 50 to installed fasteners disclosed herein with sleeve 670, upon installation the head of the bolt is closer to the nut in the disclosed fasteners compared to fastener 50. That difference in distance represents shortening of both the sleeve 670 and disclosed bolts (e.g., bolt 140) and the associated reduction in the weight of the fastener. Shortening sleeve 670 compared to sleeve 80 is facilitated by the configuration of the components described above such that sleeve 670 is preferentially retained by a tapered abutment end surface of a bolt (e.g., tapered abutment end surface 148).

Sleeve 670 may include an insert 684 positioned within enlarged bore 680. If insert 684 is included, it may be positioned with a tip of a tapered end of a nut (e.g., tapered end 120) positioned slightly within insert 684 to promote insert 684 passing over tapered end upon installation. The insert may comprise similar aspects as other inserts disclosed herein.

Although the fasteners of the present disclosure are described as being for use in aircraft structures, the fasteners may be used for any application in which a blind bolt can be utilized, for example, in submersibles, race cars, and the like.

"Wrenching portions" and "wrenching surfaces," as used herein, are intended to accommodate any known surface that can be used to engage a manual or automatic tool, including a cylindrical surface engageable by a one-way clutch or roller clutch. The blind fasteners disclosed herein can be used in both manual and automated applications. Use of cylindrical surfaces instead of wrenching flats makes it easier to use blind fasteners with automated installation robots. Conversely, in manual applications, human operators are adept at adjusting parts as required to fit geometric wrenches, and geometric wrench apparatus are generally less expensive than one-way clutches. So other applications lend themselves to the use of conventional wrenching surfaces.

Regarding break grooves 156, 256 or 356, the distal side of the break groove is flat, i.e., perpendicular to longitudinal axis LA, to maximize the thread engagement between bolt and nut. This may allow the length of the bolt and the nut to be minimized while still meeting tensile strength requirements (hence an additional weight saving feature). The geometrical configuration of the grooves or weakened regions can be varied to control the fracture characteristics of the break groove. If the tip of the break groove is sufficiently sharp, it acts as a stress concentration that may lead to a "brittle" type fracture. Conversely, if the tip of the break groove is sufficiently radiused or lengthened, then the amount of plastic deformation that occurs prior to fracture may increase, shifting the fracture to a ductile type tear. Desired performance characteristics for break grooves can be found by balancing considerations such as bolt material and groove geometry.

As used herein, "above," "top," "second end" and "front side" refer to the head side of the blind fastener that includes the head portions of the bolt and nut that is illustrated as located on the accessible side of the work pieces. Similarly, "bottom," "below," "first end" and "back side" refer to the side of the blind fastener that passes through the work pieces and may include the portions of the bolt, nut and the sleeve that are located on the blind side of the work pieces.

The figures and illustrations included herewith are drawn to scale and represent a 0.258 inch (6.5 mm) size blind fastener.

Figure 11:
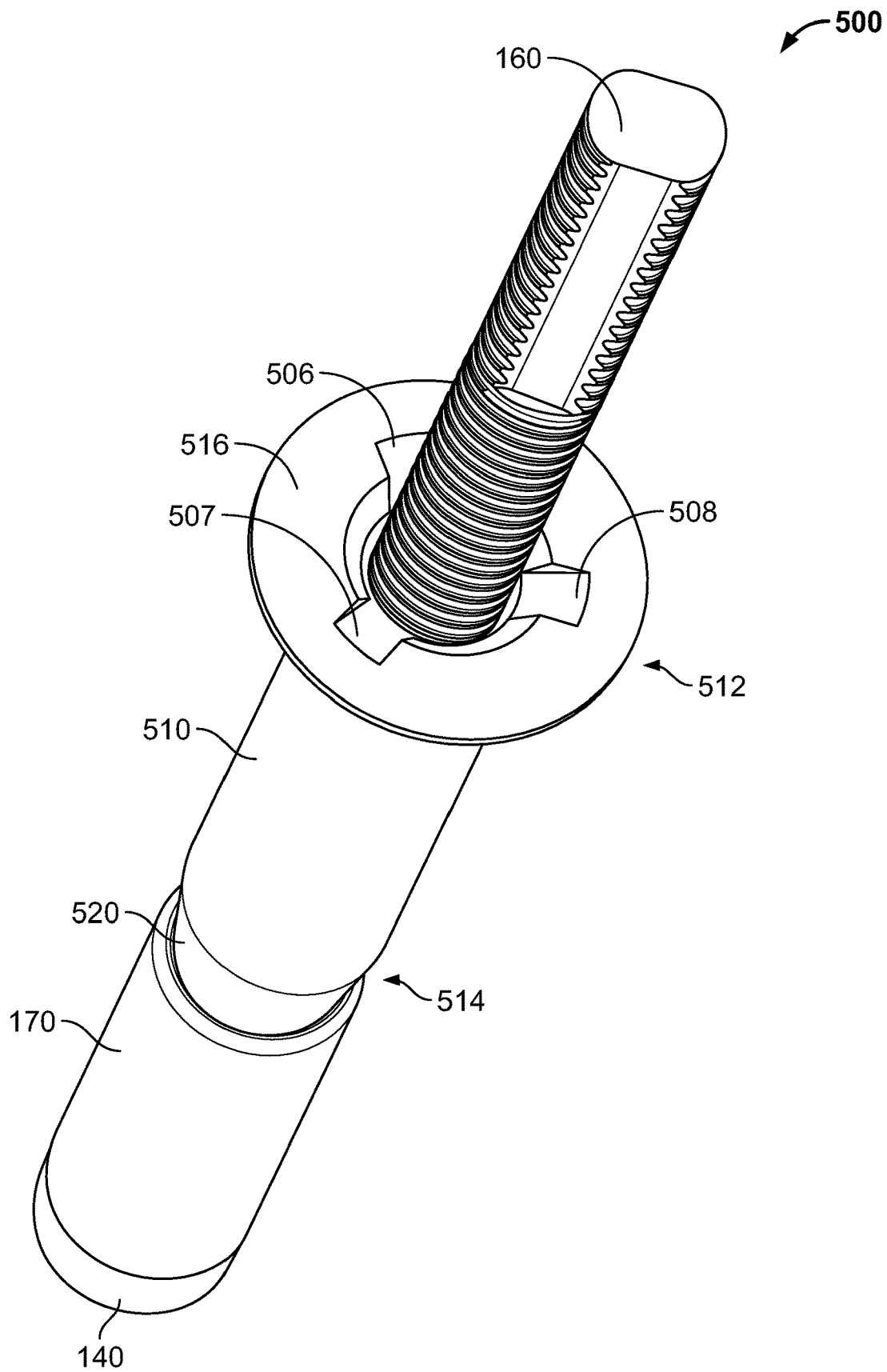
FIG. 11 is a perspective view of a blind fastener with a nut having wing recesses formed in a head of the nut.
Figure 12:
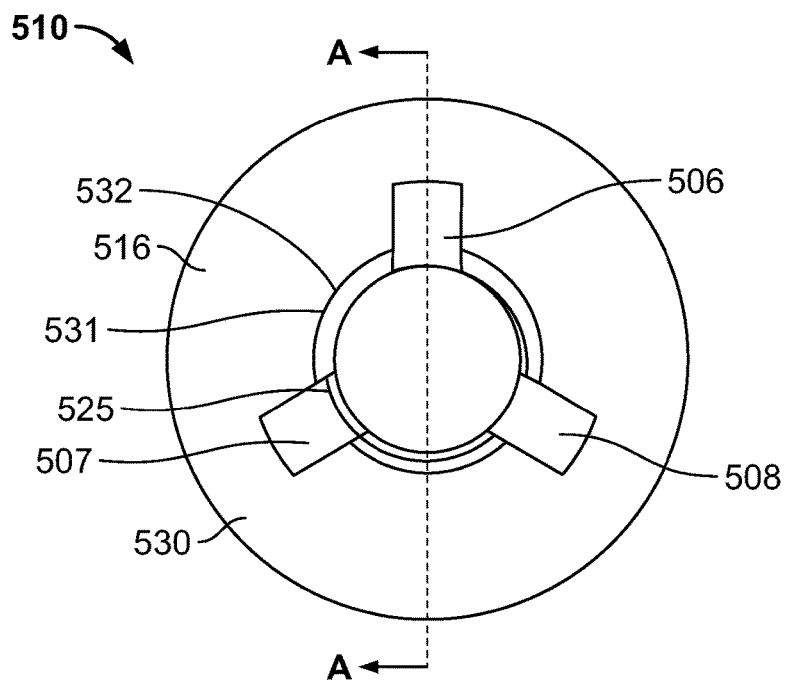
FIG. 12 is a top plan view of the nut of FIG. 11.
Figure 13:
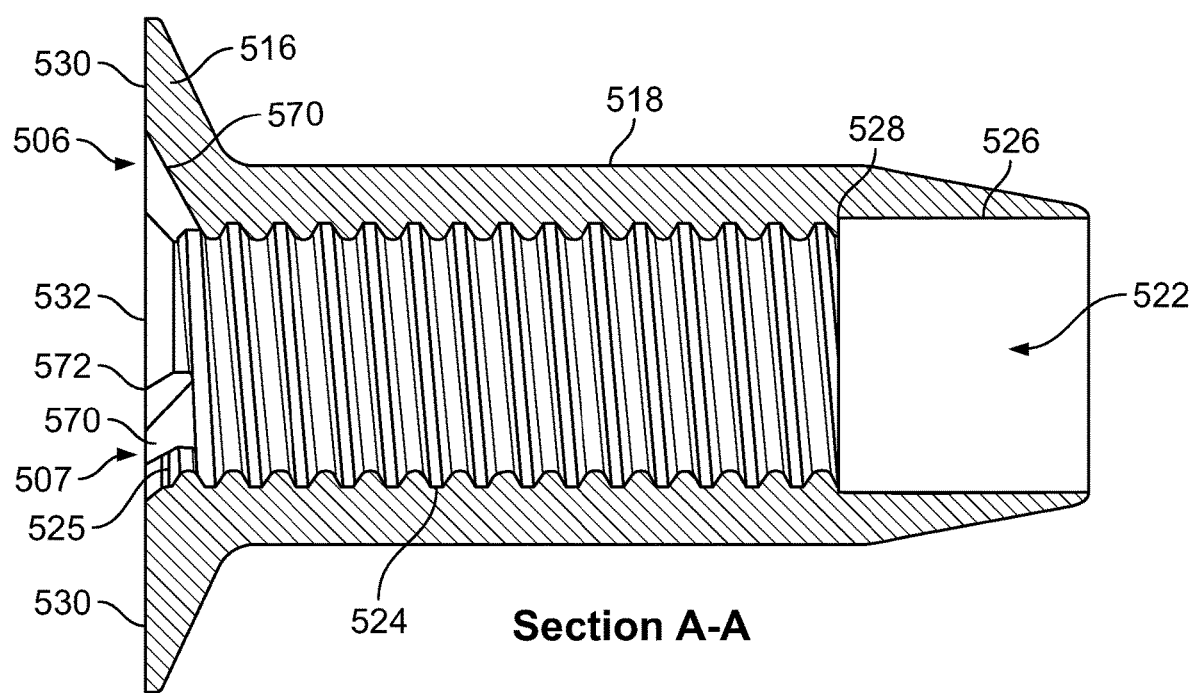
FIG. 13 is a side, cross-sectional view of the nut of FIG. 12 taken along line A-A.

Turning now to FIGS. 11-13, there depicted is a blind fastener 500 that may primarily include nut 510, bolt 140, and sleeve 170. It is further noted that the blind fastener 500 may include or interact with a drive nut, such as drive nut 190 as shown in FIGS. 2-3. Blind fastener 500 may comprise similar aspects as those described with reference to FIGS. 2-11. Moreover, the nut 510 may comprise similar aspects as described with the above disclosed embodiments (e.g., nut 110), unless context suggests otherwise or a particular distinction is made.

The nut 510 may comprise an outer surface 518 that may be generally cylindrical. The nut 510 may comprise a first end 512 and second end 514. First end 512 may include a head 516 that may comprise a generally frustoconical cross-section that tapers outward such that the vertex of the frustoconical cross-section would point away from the first end 512 and towards the second end 514 as best shown in FIG. 14.

In an aspect, the head 516 may include one or more recesses, such as recesses 506, 507, and 508. The recesses 506, 507, and 508 may be formed through the head 506 from a generally planar or unrecessed surface 530 towards the through bore 522. The recesses 506, 507, and 508 may provide for driving surfaces to engage a drive nut during installation.

In examples, the recesses 506, 507, and 508 may be generally of equal distance from each other and may be generally similar in size and shape. Solid, unrecessed, or otherwise reinforced areas 532 may thus be disposed between the recesses 506, 507, and 508. The recesses 506, 507, and 508 may be generally shallow and may span from the first end 512, through the head 516, and to the body 518. In an aspect, the recesses 506, 507, and 508 may comprise bottom surfaces 570 that may be generally angled, tapered, curved, or otherwise appropriately formed to pass from the planar surface 530 of the first end 512 to the through bore 522 at about the threads 524. In an aspect, the recesses 506, 507, and 508 may comprise a generally rectangular cutout in the planar surface 530, such as seen from a top view in FIG. 12. The cross-sectional profile of the recesses 506, 507, and 508 may generally represent a wedge-shape. It is noted, however, that the recesses 506, 507, and 508 may be differently sized and shaped.

In embodiments, the nut 510 may include an annular opening 531 on the first end 512 to the through bore 522. The recesses 506, 507, and 508 may be positioned around the annular opening 531 and may be generally equally spaced from each other. In some embodiments, however, the recesses 506, 507, and 508 may not be equally spaced from each other.

According to at least some embodiments, the nut 510 may include a shoulder 531 that may comprise an annular tapered surface that spans between the recesses 506, 507, and 508 to provide a transition from reinforced areas 532 to the through bore 522. In at least one embodiment, the inner threads 524 may comprise a thread start 525 that passes through at least one of the recesses 506, 507, and 508. In FIG. 13, the thread start 525 passes through or otherwise intersects with recess 507.

Nut 510 may provide for greater material in cross section to increase the strength of the head 516 while reducing parasitic drag, in comparison with nuts having more than three recesses. It is further noted that the amount of reduction in parasitic drag has been shown to outweigh any advantages resulting from reduction in weight of nuts with four or more recesses. To the degree the break-off is more closely controlled to approximate a flush characteristic and voids, such as those of the recesses, are eliminated, "parasitic drag" is reduced.

It is noted that the described embodiments may be particularly well suited for lap shear conditions. In embodiments, the recesses 506, 507, and 508 positioning forces any potential stresses to be non-linear, making cracks less likely to propagate across the head 516. The additional advantage in our adoption is related to aerodynamics with the three wing design presenting one less void in the head to introduce drag.

The second end 514 may comprise tapered end 520 with tapered end defining a generally frustoconical shape that tapers towards the second end 514 such that the vertex of the frustoconical shape points towards the second end 514.

Nut 510 defines through bore 522 that is internally threaded with internal threads 524 and also defines internal unthreaded recess 526 defining shoulder 528 positioned between recess 526 and internal threads 524. Recess 526 defines a generally cylindrical shaped as described herein. It is noted that the bore 522 may interact with the bolt 140 as described herein.

In the illustrated embodiment, head 516 is configured to fit within a countersunk recess in a workpiece and defines a generally frustoconical tapered head shape. Head 516 may also include wrenching surfaces for engagement with a tool or with drive nut 190.

While the disclosure has been illustrated and described in detail in the drawings and foregoing description, the same is to be considered as illustrative and not restrictive in character, it being understood that only certain specific embodiments have been shown and that all changes and modifications that come within the spirit of the disclosure are desired to be protected. Though applicant has described various aspects of the disclosure with respect to specific embodiments, various alternative and modifications will be apparent from the present disclosure that are within the scope and spirit of the present disclosure as set forth herein. Further, it should be understood that any aspects of any of the embodiments disclosed herein or similar aspects or structure may be combined or interchanged.

We claim:

1. A fastener comprising:
a nut having a bore aligned along a longitudinal axis, a head on a first end with three recesses extending from the first end through the head and to the bore, a cylindrical outer surface and an external tapered ramp surface on a second end;
a bolt having a head, an enlarged shank positioned between an externally threaded portion and a first recess positioned proximate to the head of the bolt, wherein an outer diameter of the first recess is smaller than a maximum diameter of the bore and wherein an outer diameter of the enlarged shank is larger than a maximum diameter of the externally threaded portion; and
a sleeve having a sleeve bore and a first end crimped into the first recess, wherein the sleeve is positioned between the external tapered ramp surface and wherein an internal diameter of the sleeve bore proximate to the first end is smaller than the maximum diameter of the externally threaded portion,
wherein the nut bore comprises an internally threaded portion and an unthreaded cylindrical recess extending from the second end toward the first end and wherein an internal diameter of said unthreaded cylindrical recess is larger than an outer diameter of the enlarged shank.

2. The fastener of claim 1, wherein an axial length of the unthreaded cylindrical recess is less than a corresponding axial length of the enlarged shank.

3. The fastener of claim 1, wherein the bolt includes a second recess positioned between the enlarged shank and the externally threaded portion so that an outer diameter of the second recess is smaller than a minimum diameter of the externally threaded portion.

4. The fastener of claim 1, wherein the head of the nut includes non-recessed portions positioned between each of the three recesses.

5. The fastener of claim 4, wherein the bolt includes a break groove positioned to break substantially flush at the non-recessed portions.

6. The fastener of claim 5, wherein the enlarged shank defines a stop shoulder that cooperates with the nut to block movement of the bolt relative to the nut when the break groove is positioned substantially flush with the non-recessed portions.

7. The fastener of claim 1, wherein the three recesses engage an installation drive nut.

8. The fastener of claim 1, wherein the three recesses are equally spaced from each other.

9. The fastener of claim 1, wherein each of the three recesses are similarly sized and shaped.

10. The fastener of claim 1, wherein the head of the nut has a frustoconical tapered shape.

11. The fastener of claim 1, wherein the head of the nut has a hexagonal shape.

* * * * *